United States Patent
Guérin et al.

(10) Patent No.: US 11,694,372 B2
(45) Date of Patent: *Jul. 4, 2023

(54) NON-LINEAR COLOR CORRECTION

(71) Applicant: GoPro, Inc., San Mateo, CA (US)

(72) Inventors: Guillaume Matthieu Guérin, Chatillon (FR); Julien Caron, Guyancourt (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,321

(22) Filed: Sep. 30, 2021

(65) Prior Publication Data
US 2022/0020183 A1    Jan. 20, 2022

Related U.S. Application Data

(63) Continuation of application No. 16/655,944, filed on Oct. 17, 2019, now Pat. No. 11,138,765.

(60) Provisional application No. 62/777,408, filed on Dec. 10, 2018.

(51) Int. Cl.
*G06T 11/00* (2006.01)

(52) U.S. Cl.
CPC ........ *G06T 11/001* (2013.01); *G06T 2200/32* (2013.01)

(58) Field of Classification Search
CPC . G06T 11/001; G06T 2200/32; H04N 1/6002; H04N 1/6027; H04N 1/6075
See application file for complete search history.

(56) References Cited

U.S. PATENT DOCUMENTS

| | | | |
|---|---|---|---|
| 6,724,935 B1 | 4/2004 | Sawada | |
| 8,570,341 B1* | 10/2013 | Xie | ...... H04N 1/6027 382/163 |
| 8,654,141 B2 | 2/2014 | Zhang | |
| 8,942,476 B1 | 1/2015 | Rangaswamy | |
| 9,247,107 B2* | 1/2016 | Imaseki | ...... H04N 1/603 |
| 11,138,765 B2 | 10/2021 | Guérin | |
| 11,223,748 B2* | 1/2022 | Bae | ...... H04N 1/6058 |
| 11,290,696 B2* | 3/2022 | Stauder | ...... H04N 9/643 |
| 2006/0087699 A1 | 4/2006 | Matsuhira | |
| 2006/0119870 A1* | 6/2006 | Ho | ...... H04N 1/6058 358/1.9 |
| 2007/0188666 A1 | 8/2007 | Oh | |
| 2008/0044082 A1 | 2/2008 | Muller | |
| 2008/0129750 A1 | 6/2008 | Voliter | |

(Continued)

*Primary Examiner* — Maurice L. McDowell, Jr.
(74) *Attorney, Agent, or Firm* — Young Basile Hanlon & MacFarlane, P.C.

(57) ABSTRACT

Systems and methods are disclosed for non-linear color correction. The method including receiving an input image from an image sensor, converting the input image from a red, green, blue (RGB) color space format to an alternate color space format, determining localized hue correction parameters for a selected color in the alternate color space, determining localized saturation correction parameters for a selected hue in the alternate color space, applying the localized hue correction parameters and the localized saturation correction parameters to the input image to generate an output image and storing, displaying, or transmitting the output image based on at least the localized hue correction parameters and the localized saturation correction parameters.

20 Claims, 12 Drawing Sheets
(5 of 12 Drawing Sheet(s) Filed in Color)

(56) References Cited

U.S. PATENT DOCUMENTS

| | | |
|---|---|---|
| 2008/0310711 A1 | 12/2008 | Jo |
| 2009/0040542 A1 | 2/2009 | Furui |
| 2009/0046171 A1* | 2/2009 | Kogan ............... H04N 9/643 |
| | | 382/167 |
| 2009/0060326 A1 | 3/2009 | Imai |
| 2009/0315911 A1* | 12/2009 | Ohnishi ............. G09G 5/026 |
| | | 345/593 |
| 2010/0091034 A1 | 4/2010 | Matsumoto |
| 2010/0245379 A1 | 9/2010 | Koyama |
| 2011/0157212 A1 | 6/2011 | Zhang |
| 2011/0234622 A1 | 9/2011 | Fujita |
| 2011/0285746 A1 | 11/2011 | Swic |
| 2012/0056911 A1 | 3/2012 | Safaee-Rad |
| 2012/0081385 A1 | 4/2012 | Cote |
| 2013/0063741 A1 | 3/2013 | Miyazaki |
| 2014/0176594 A1 | 6/2014 | Yang |
| 2014/0292801 A1 | 10/2014 | Kim |
| 2015/0279057 A1* | 10/2015 | Ohtsuka ............ G06T 11/001 |
| | | 345/591 |
| 2016/0148596 A1 | 5/2016 | Bhattacharjee |
| 2018/0324329 A1* | 11/2018 | Thebault ........... H04N 1/6075 |
| 2019/0385343 A1* | 12/2019 | Rao ................... G06T 5/003 |
| 2020/0106928 A1* | 4/2020 | Thebault ........... H04N 1/6066 |
| 2020/0184690 A1 | 6/2020 | Guérin |
| 2021/0287348 A1* | 9/2021 | Partin ............... H04N 1/6066 |

\* cited by examiner

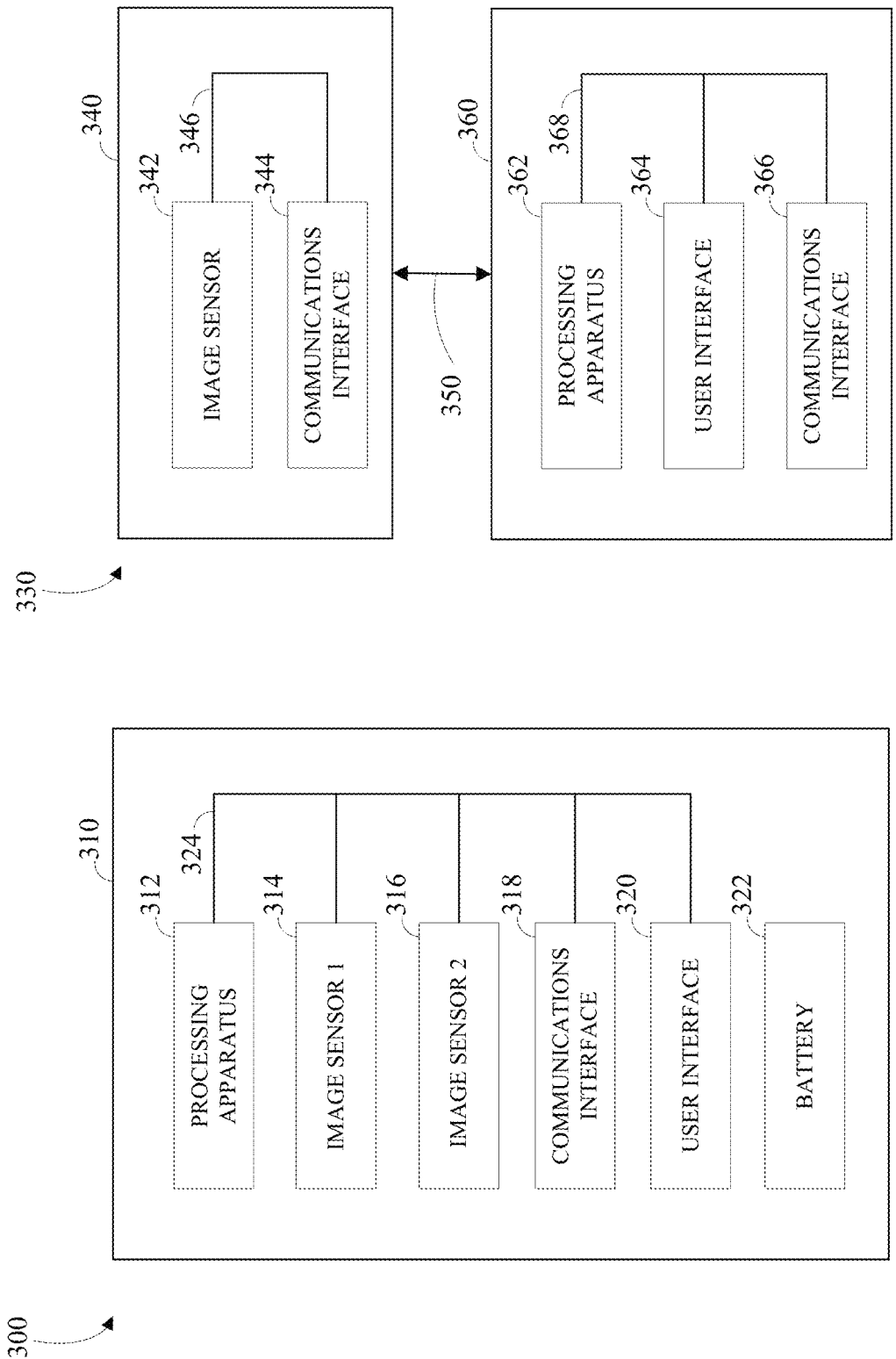

NON-LINEAR COLOR CORRECTION

CROSS-REFERENCE TO RELATED APPLICATIONS

This application is a continuation of U.S. patent application Ser. No. 16/655,944, filed Oct. 17, 2019, which claims priority to and the benefit of U.S. Provisional Patent Application No. 62/777,408, filed Dec. 10, 2018, the entire disclosure of which is incorporated by reference herein.

TECHNICAL FIELD

This disclosure relates to non-linear color correction.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames from different image sensors may include spatially adjacent or overlapping content, which may be stitched together to form a larger image with a larger field of view. The image stitching process may introduce distortions that depend on the objects appearing within the field of view of the camera and/or the relative positions and orientations of those objects.

SUMMARY

Disclosed herein are systems and methods for non-linear color correction.

In a first aspect, a method may include receiving an input image from an image sensor. The received input image is converted from a red, green, blue (RGB) color space format to an alternate color space format. Localized color correction parameters are determined for a selected color in the alternate color space. The localized color correction parameters are applied to the input image to generate an output image. The output image is stored, displayed, or transmitted based on at least the localized color correction parameters. In an implementation, the localized color correction parameters are converted from the alternate color space format to the RGB color space format, where the applying the localized color correction parameters is performed in the RGB color space format. In an implementation, the determining localized color correction parameters further includes determining localized hue correction parameters for a given dimension and determining localized saturation correction parameters for a given hue.

In an implementation, the determining localized hue correction parameters further includes selecting an angle on a color plan, selecting a target angle on the color plan, rotating the target angle towards the angle to generate a rotated color plan, and blending the color plan and the rotated color plan to generate the localized hue correction parameters, where the angle and the target angle represent hues on the color plan and the rotated color plan. In an implementation, the blending is a weighted blending favoring the color plan in the non-selected angles to localize the hue change. In an implementation, the determining localized saturation correction parameters further includes selecting at least one target saturation value for the color plan to generate a saturation modified color plan and blending the color plan and the saturation modified color plan to generate the localized saturation correction parameters. In an implementation, the selecting at least one target saturation value further includes using a defined function to provide a range of target saturation values. In an implementation, the blending is a weighted blending favoring the color plan to localize the saturation change.

In an implementation, the determining localized hue correction parameters further includes selecting an angle on a color plan, selecting a target angle on the color plan, selecting a compression angle on the color plan, selecting an extension angle on the color plan, compressing a color range between the target angle and the compression angle into a color range defined by the angle and the compression angle, and extending a color range between the target angle and extension angle into a color range defined by the angle and the extension angle, where the compressing and extending are performed to generate the localized hue correction parameters and where the angle, the target angle, the compression angle and the extension angle represent hues on the color plan. In an implementation, the determining localized saturation correction parameters further includes selecting at least one target saturation value for the color plan to generate a saturation modified color plan and blending the color plan and the saturation modified color plan to generate the localized saturation correction parameters. In an implementation, the alternate color space includes at least hue, saturation, and lightness (HSL), hue, saturation, and value (HSV) and luminance, chrominance red, and chrominance blue (YCbCr), and luminance and two chrominance (YUV) color spaces.

In a second aspect, a system includes an image sensor configured to capture an image and an image processor configured to receive the captured image. The image processor includes a color space conversion unit configured to convert the captured image to an alternate color space and a non-linear color correction unit configured to generate non-linear color correction parameters in the alternate color space and apply the non-linear color correction parameters to the captured image to generate an output image. The image processor is configured to store, display, or transmit the output image based on at least the non-linear color correction parameters. In an implementation, the non-linear color correction unit is further configured to determine hue correction parameters for a given dimension and determine saturation correction parameters for a given hue, where the hue correction parameters and the saturation correction parameters affect a selected hue plus a margin. In an implementation, the non-linear color correction unit is further configured to rotate a target angle towards a selected angle to generate a rotated color plan from a color plan and generate the hue correction parameters based on a weighted blending of the color plan and the rotated color plan, where the selected angle and the target angle represent hues on the color plan and the rotated color plan. In an implementation, the weights favor the color plan at non-selected angles. In an implementation, the non-linear color correction unit is further configured to select a range of target saturation values to generate a saturation modified color plan and generate a saturation correction parameter based on a weighted blending of the color plan and the saturation modified color plan. In an implementation, the non-linear color correction unit is further configured to compress a color range between a target angle and a compression angle into a color range defined by a selected angle and the compression angle and extend a color range between the target angle and an extension angle into a color range defined by the selected angle and the extension angle, where the hue correction parameters are generated based on compression and extension. In an implementation, the alternate color space includes at least hue, saturation, and lightness (HSL), hue, saturation, and value (HSV) and luminance, chrominance red, and chrominance blue (YCbCr), and luminance and two chrominance (YUV) color spaces.

In a third aspect, a method includes receiving an input image from an image sensor. The input image is converted from a red, green, blue (RGB) color space format to an alternate color space format. Localized hue correction parameters are determined for a selected color in the alternate color space. Localized saturation correction parameters are determined for a selected hue in the alternate color space. The localized hue correction parameters and the localized saturation correction parameters are applied to the input image to generate an output image. The output image is stored, displayed, or transmitted based on at least the localized hue correction parameters and the localized saturation correction parameters. In an implementation, the alternate color space includes at least hue, saturation, and lightness (HSL), hue, saturation, and value (HSV) and luminance, chrominance red, and chrominance blue (YCbCr), and luminance and two chrominance (YUV) color spaces.

In a fourth aspect, a method includes receiving an input image from an image sensor and determining localized color correction parameters for a selected color and a selected dimension in a color space where dimensions defining the color space are independently adjustable. The determining further includes selecting an angle on a color plan, selecting a target angle on the color plan, and applying a function between the angle and the target angle to determine the localized color correction parameters. The method further includes applying the localized color correction parameters to the input image to generate an output image and storing, displaying, or transmitting the output image based on at least the localized color correction parameters.

In an implementation, the applying the localized color correction parameters is done in a linear color space. In an implementation, the applying the localized color correction parameters is done in the color space. In an implementation, the determining localized color correction parameters further includes determining localized hue correction parameters, wherein hue is the selected dimension. In an implementation, the determining localized color correction parameters further includes determining localized saturation correction parameters for a given hue, wherein saturation is another selected dimension. In an implementation, the determining localized color correction parameters further includes determining localized saturation correction parameters, wherein saturation is the selected dimension. In an implementation, the determining localized color correction parameters further includes determining localized hue correction parameters for a given saturation, wherein hue is another selected dimension. In an implementation, the applying a function includes rotating the target angle towards the angle to generate a rotated color plan and blending the color plan and the rotated color plan to generate the localized correction parameters, where the angle and the target angle represent the selected dimension on the color plan and the rotated color plan. In an implementation, the blending is a weighted blending favoring the color plan in non-selected angles to localize changes. In an implementation, the applying the function includes selecting a compression angle on the color plan, selecting an extension angle on the color plan, compressing a color range between the target angle and the compression angle into a color range defined by the angle and the compression angle, and extending a color range between the target angle and the extension angle into a color range defined by the angle and the extension angle, where the compressing and the extending are performed to generate the localized color correction parameters, and where the angle, the target angle, the compression angle, and the extension angle represent the selected dimension on the color plan. In an implementation, the color space includes at least hue, saturation, and lightness (HSL), hue, saturation, and value (HSV), luminance, chrominance red, and chrominance blue (YCbCr), and luminance and two chrominance (YUV) color spaces.

In a fifth aspect, a method includes receiving an input image from an image sensor in a linear color space determining localized color correction parameters for a selected color and a selected dimension in a color space by applying a function between an angle and a target angle in a color plan, wherein dimensions defining the color space are independently adjustable, applying, in the linear color space, the localized color correction parameters to the input image to generate an output image, and storing, displaying, or transmitting the output image based on at least the localized color correction parameters.

In an implementation, the determining localized color correction parameters further includes selecting the angle on the color plan and selecting the target angle on the color plan. In an implementation, the determining localized color correction parameters further comprises at least one of determining localized hue correction parameters, wherein hue is the selected dimension or determining localized saturation correction parameters, wherein saturation is the selected dimension. In an implementation, the applying a function includes rotating the target angle towards the angle to generate a rotated color plan and blending the color plan and the rotated color plan to generate the localized correction parameters, where the angle and the target angle represent the selected dimension on the color plan and the rotated color plan. In an implementation, the applying the function includes selecting a compression angle on the color plan, selecting an extension angle on the color plan, compressing a color range between the target angle and the compression angle into a color range defined by the angle and the compression angle, and extending a color range between the target angle and the extension angle into a color range defined by the angle and the extension angle, where the compressing and extending are performed to generate the localized color correction parameters and where the angle, the target angle, the compression angle and the extension angle represent the selected dimension on the color plan.

In a sixth aspect, a method includes receiving an input image from an image sensor, determining localized color correction parameters for a selected color and a selected dimension in a color space by applying a function between an angle and a target angle in a color plan, wherein dimensions defining the color space are independently adjustable, applying the localized color correction parameters to the input image to generate an output image, and storing, displaying, or transmitting the output image based on at least the localized color correction parameters.

In an implementation, the applying the localized color correction parameters is done in a linear color space. In an implementation, the applying the localized color correction parameters is done in the color space. In an implementation, the determining localized color correction parameters further comprises at least one of determining localized hue correction parameters, wherein hue is the selected dimension or determining localized saturation correction parameters, wherein saturation is the selected dimension.

BRIEF DESCRIPTION OF THE DRAWINGS

The patent or application file contains at least one drawing executed in color. Copies of this patent or patent application publication with color drawings will be provided by the Office upon request and payment of the necessary fee.

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems in accordance with embodiments of this disclosure.

DETAILED DESCRIPTION

Figure 1A:
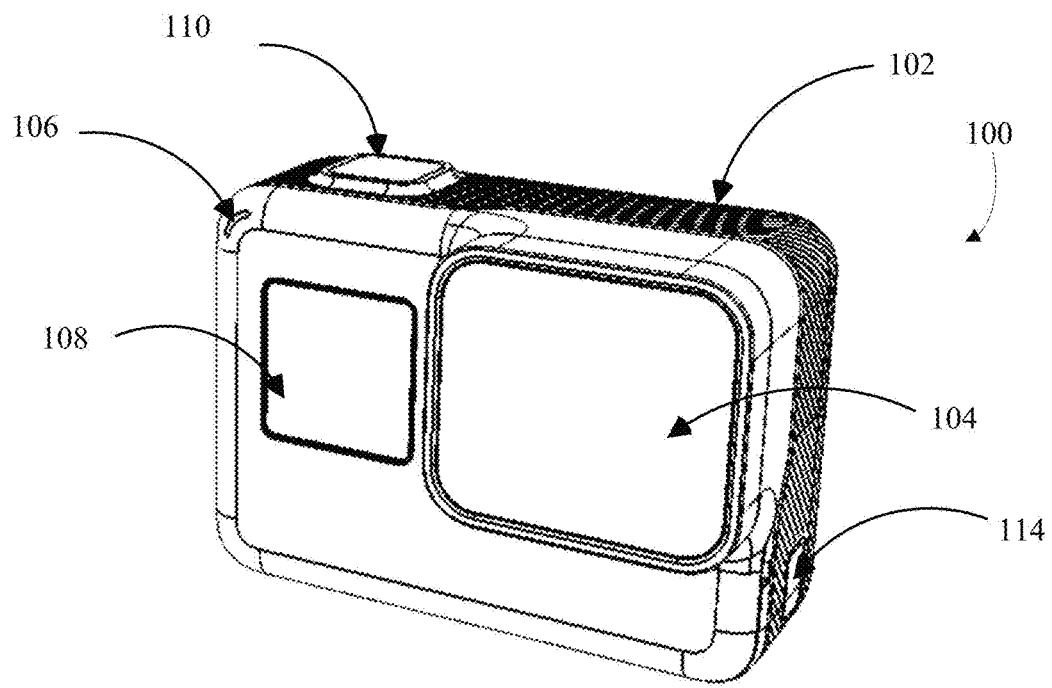
FIGS. 1A-D are isometric views of an example of an image capture device in accordance with embodiments of this disclosure.
Figure 1B:
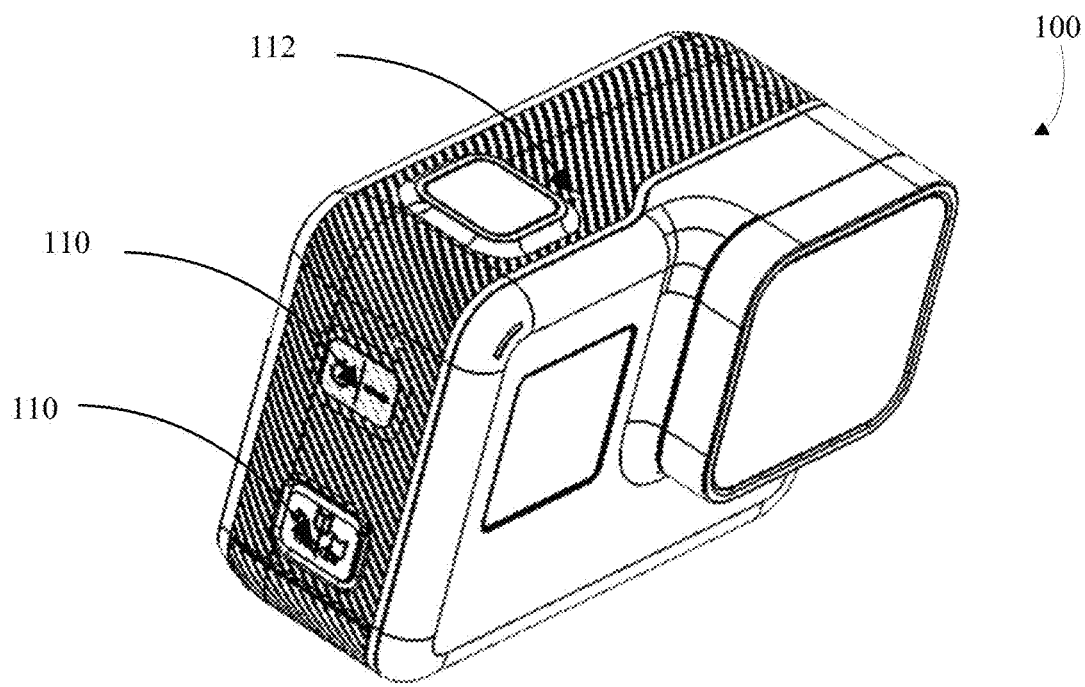
Figure 1C:
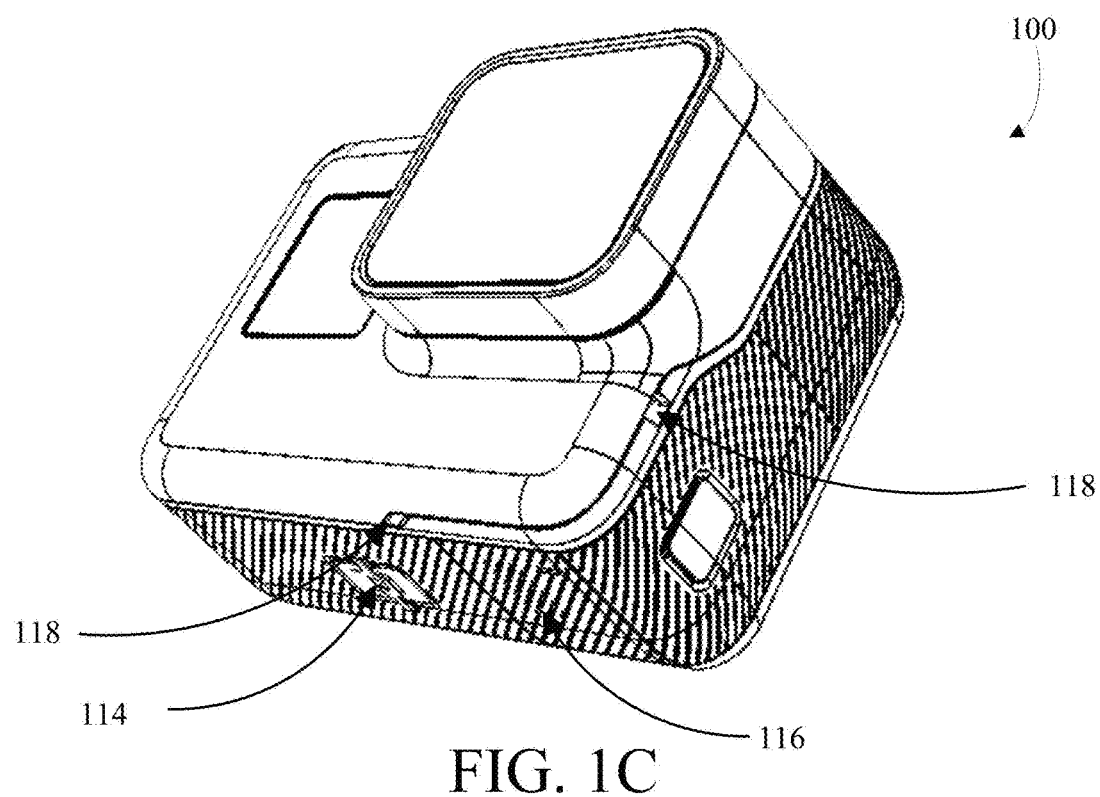
Figure 1D:
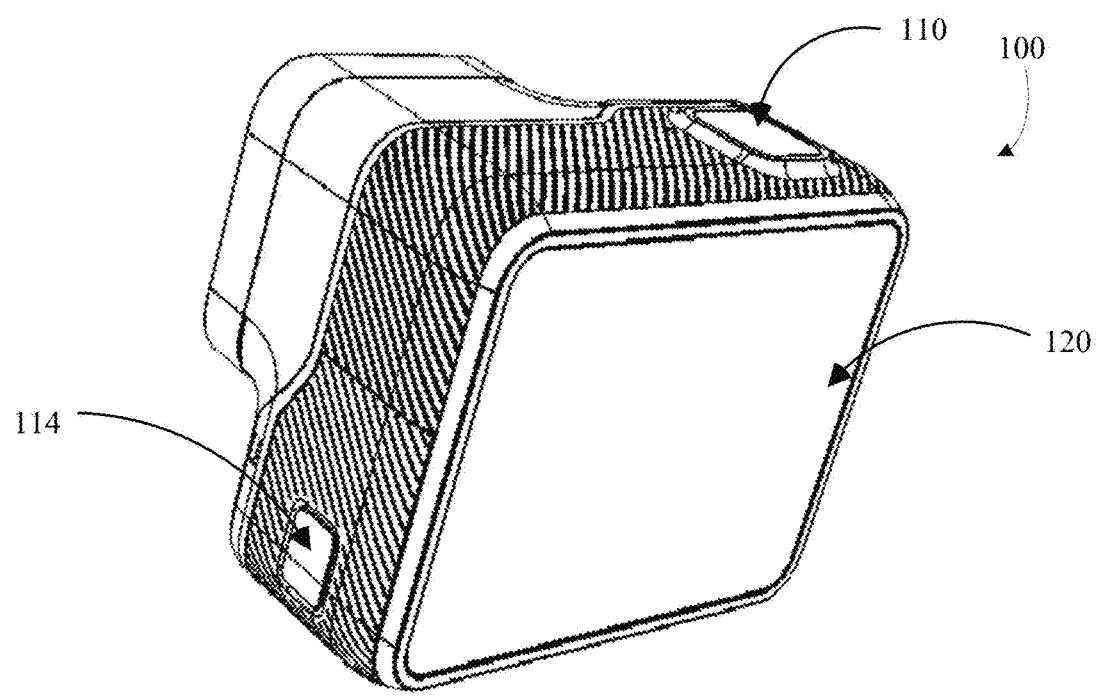

This document includes disclosure of systems, apparatus, and methods for non-linear color correction, where non-linear color correction refers to localized correction, transformation and enhancement of a color, and saturation in an image. This is a complex color transform. For example, color correction may be performed by distorting a three-dimensional (3D) grid in the red, green, and blue (RGB) color space. This may be implemented by applying a 3D look-up table to images in the RGB color space. This technique is difficult to tune due to the number of parameters that need to be computed and stored, is resource and memory intensive, and may globally affect non-selected colors in the image.

Non-linear color correction techniques performed in alternate color spaces may address the above complexities. These alternate color spaces may include hue, saturation, and lightness (HSL), hue, saturation, and value (HSV), luminance, chrominance red, and chrominance blue (YCbCr), and luminance and two chrominance (YUV) color spaces. A characteristic of these alternate color spaces is that each set of defining dimensions or attributes are independent and separate. In an implementation, the non-linear color correction techniques may ignore one of the dimensions and operate in the remaining two dimensions. In an implementation, the non-linear color correction techniques may operate in a particular dimension to modify a color associated with an object in a scene. For example, in a scene having a sky background, the blue may be made more saturated. In another example, skin tones may be made more radiant and shadows may be enhanced by removing chroma noise in dark areas.

In an implementation, the non-linear color correction techniques may operate in the hue and saturation dimensions to modify a selected or designated color. The non-linear color correction techniques may alter a hue attribute, a saturation attribute, or both attributes. The techniques may make the alterations without affecting or minimally affecting the other colors. Accordingly, these techniques may provide images with intense, bright, and saturated colors for each object.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LED display 108. The image capture device 100 may also include buttons 110 configured to allow a user of the image capture device 100 to interact with the image capture device 100, to turn the image capture device 100 on, and to otherwise configure the operating mode of the image capture device 100. The image capture device 100 may also include a microphone 112 configured to receive and record audio signals in conjunction with recording video. A side of the image capture device 100 may include an I/O interface 114. The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects the internal electronics which are further described in later sections. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (not shown). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
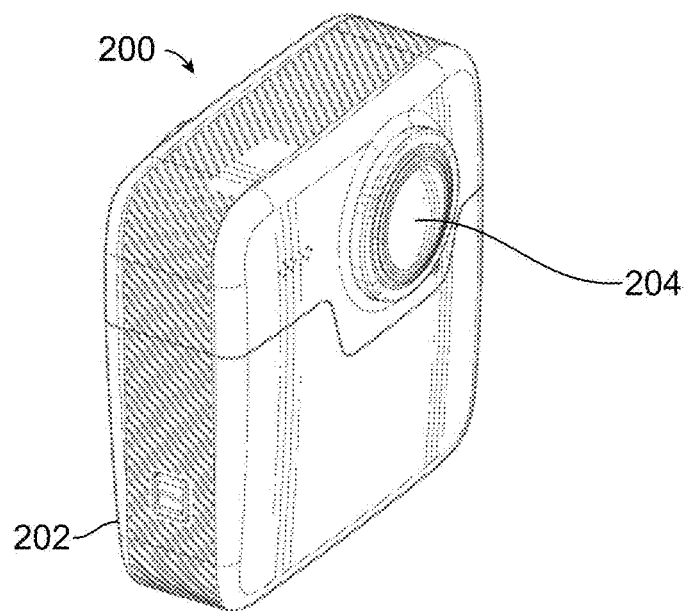
FIGS. 2A-B are isometric views of another example of an image capture device in accordance with embodiments of this disclosure.
Figure 2B:
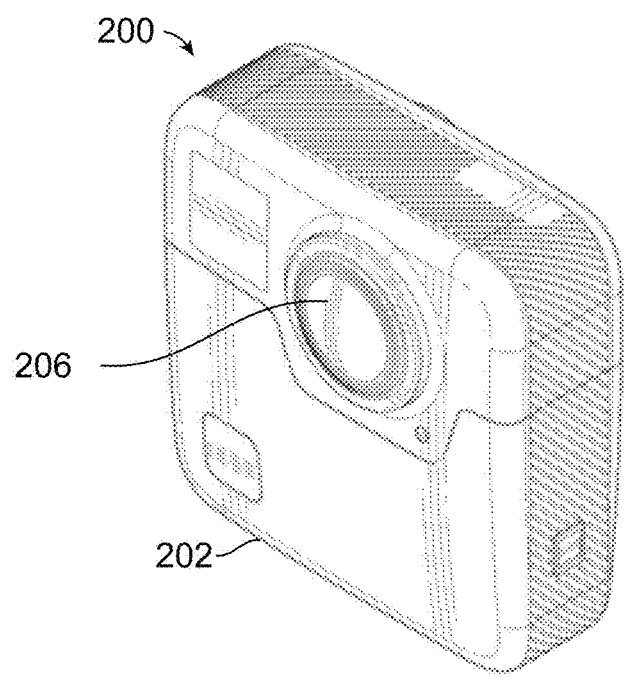

FIGS. 2A-B illustrate an image capture device 200 according to one embodiment. The image capture device 200 comprises a camera body 202 having two camera lenses 204, 206 structured on front and back surfaces of the camera body 202, various indicators on the front and/or back surface of the camera body 202 (such as LEDs, displays, and the like), various input mechanisms (such as buttons, switches, microphones, and touch-screen mechanisms), and electronics (e.g., imaging electronics, power electronics, etc.) internal to the camera body 202 for capturing images via the camera lenses 204, 206 and/or performing other functions. The two lenses 204, 206 are oriented in opposite directions and couple with two images sensors mounted on circuit boards (not shown). Other electrical camera components (e.g., an image processor, camera SoC (system-on-chip), etc.) may also be included on one or more circuit boards within the camera body 202 of the image capture device 200.

Figure 2C:
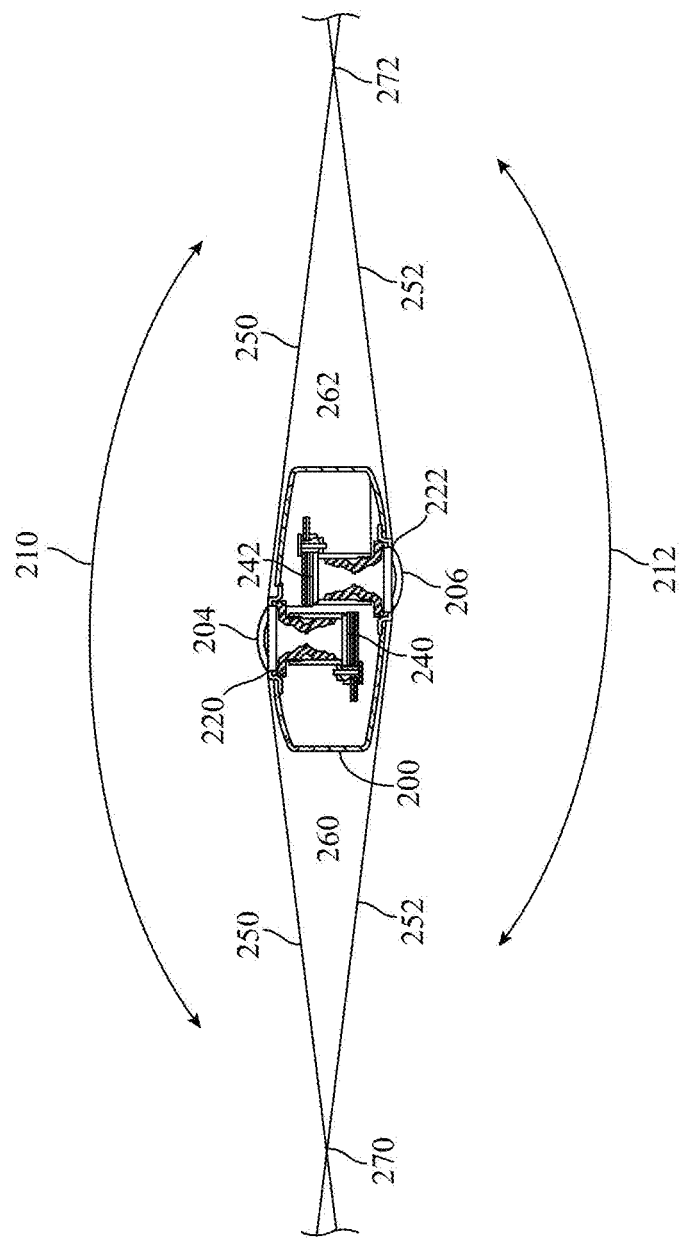
FIG. 2C is a cross-sectional view of the image capture device of FIGS. 2A-B in accordance with embodiments of this disclosure.

FIG. 2C is a cross-sectional view of the image capture device 200 of FIGS. 2A-B. In some implementations, the image capture device 200 may be a spherical image capture device with fields-of-view 210, 212 as shown in FIG. 2C. For example, the image capture device 200 may include image capture devices 220, 222, related components, or a combination thereof, arranged in a back-to-back or Janus configuration. For example, a first image capture device 220 may include the first lens 204 and a first image sensor 240, and a second image capture device 222 may include the second lens 206 and a second image sensor 242 arranged oppositely from the first lens 204 and the first image sensor 240.

The first lens 204 of the image capture device 200 may have the field-of-view 210 shown above a boundary 250. Behind the first lens 204, the first image sensor 240 may capture a first hyper-hemispherical image plane from light entering the first lens 204, corresponding to the first field-of-view 210.

The second lens 206 of the image capture device 200 may have a field-of-view 212 as shown below a boundary 252. Behind the second lens 206, the second image sensor 242 may capture a second hyper-hemispherical image plane from light entering the second lens 206, corresponding to the second field-of-view 212.

One or more areas, such as blind spots 260, 262, may be outside of the fields-of-view 210, 212 of the lenses 204, 206, light may be obscured from the lenses 204, 206 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 204, 206, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A slight change in the alignment, such as position and/or tilt, of the lenses 204, 206, the image sensors 240, 242, or both, may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 204, 206 and the image sensors 240, 242 such that the fields-of-view 210, 212, stitch points 270, 272, or both may be accurately determined, which may improve the accuracy, efficiency, or both of generating a combined image.

Optical axes through the lenses 204, 206 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 204, 206, such that the image sensors may be perpendicular to the respective axes to within a tolerance such as 1%, 3%, 5%, 10%, and/or other tolerances.

The lenses 204, 206 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 204, 206 may include substantially reduced thickness relative to the lengths of the lens barrels securing the lenses 204, 206. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 210, 212.

Images or frames captured by an image capture device, such as the image capture device 100 shown in FIGS. 1A-D or the image capture device 200 shown in FIGS. 2A-C, may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D or the image capture device 200 shown in FIGS. 2A-B.

The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 4:
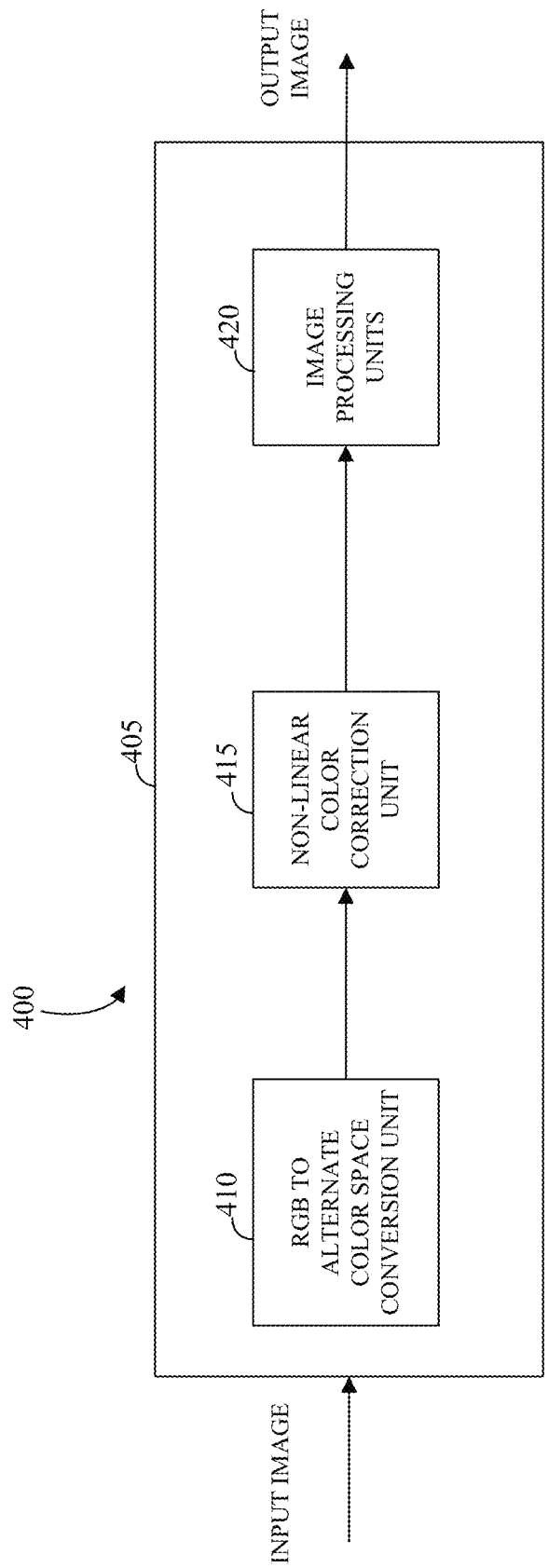
FIG. 4 is a functional block diagram of an example of an image processing pipeline in accordance with embodiments of this disclosure.
Figure 5:
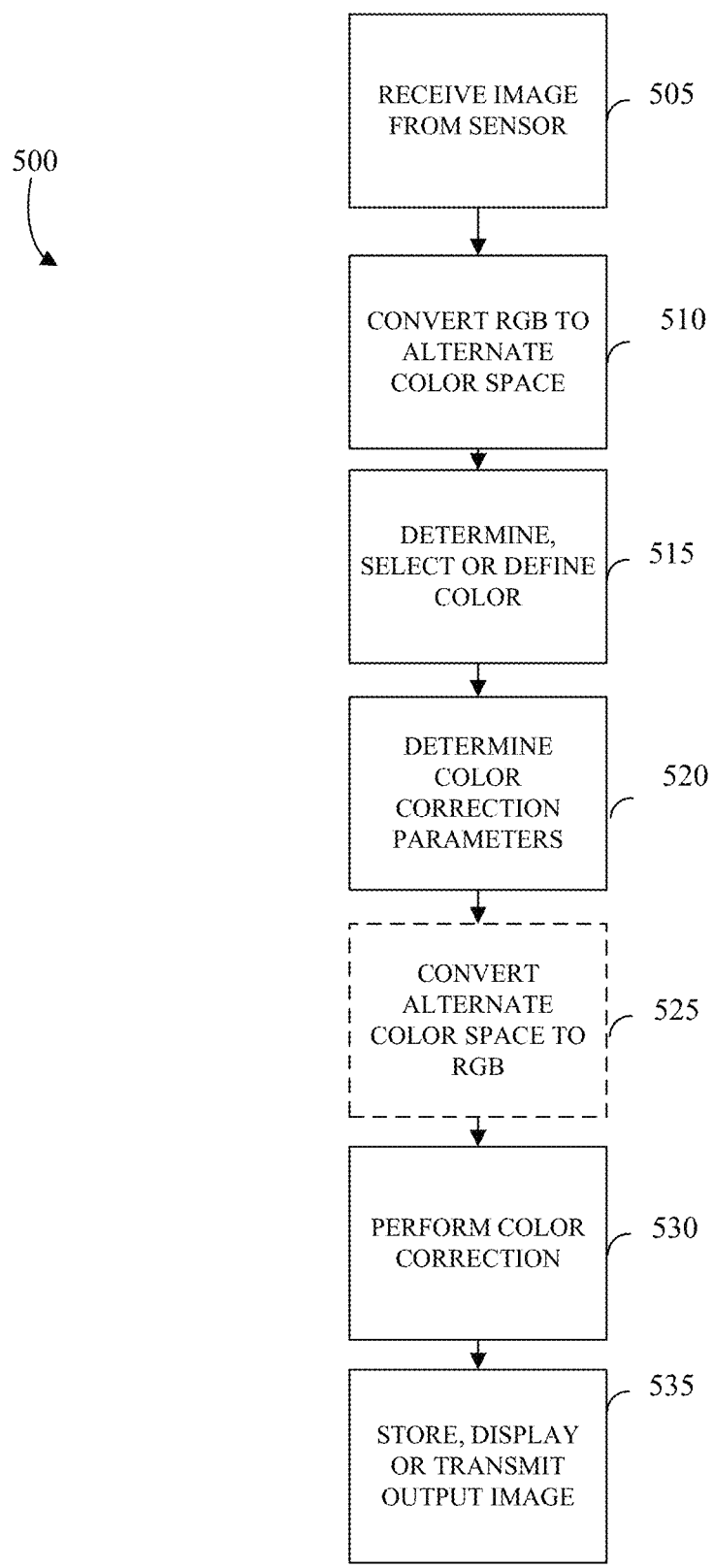
FIG. 5 is a flowchart of an example technique for non-linear color correction of captured images in accordance with embodiments of this disclosure.

The image capture system 300 may implement some or all of the techniques described in this disclosure, such as the techniques for non-linear color correction described with respect to FIGS. 4-5.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D or the image capture device 200 shown in FIGS. 2A-C. The personal computing device 360 may, for example, be the user interface device described with respect to FIGS. 1A-D.

The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor 342 and a second image from the second image sensor 344. The processing apparatus 362 may be configured to perform image signal processing (e.g., filtering, tone mapping, stitching, and/or encoding) to generate output images based on image data from the image sensors 342, 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via a bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or snap photograph) received via the user interface 364 may be passed on to the image capture device 340 via the communications link 350.

The image capture device 340 and/or the personal computing device 360 may be used to implement some or all of the techniques described in this disclosure, such as the techniques for non-linear color correction processing described with respect to FIGS. 4-5.

FIG. 4 is a block diagram of an example of an image processing pipeline 400 in accordance with implementations of this disclosure. In some implementations, the image processing pipeline 400 may be included in an image capture device, such as the image capture device 100 shown in FIGS. 1A-1D, the image capture device 200 shown in FIGS. 2A-2D or the image capture device 310 shown in FIGS. 3A-3B. In some implementations, the image processing 400 may include an image signal processor (ISP) 405.

The image signal processor 405 may receive an input image signal and output an output image. For example, an image sensor (not shown), such as a first image sensor 240 or second image sensor 242 shown in FIG. 2C, may capture an image, or a portion thereof, and may send, or transmit, the captured image, or image portion, to the image signal processor 405 as the input image signal. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second. In an implementation, the image may be in a RGB format, which may represent individual pixels using a combination of values or components, such as a red component (R), a green component (G), and a blue component (B).

The image signal processor 405 may include a RGB-to-Alternate Color Space unit (R2ACS) unit 410. The R2ACS unit 410 may convert the RGB format to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats. For example, the other formats may be HSL, HSV, YCbCr, YUV, and the like color space formats. Examples of color spaces are described in FIGS. 6, 7, and 8.

Figure 6:
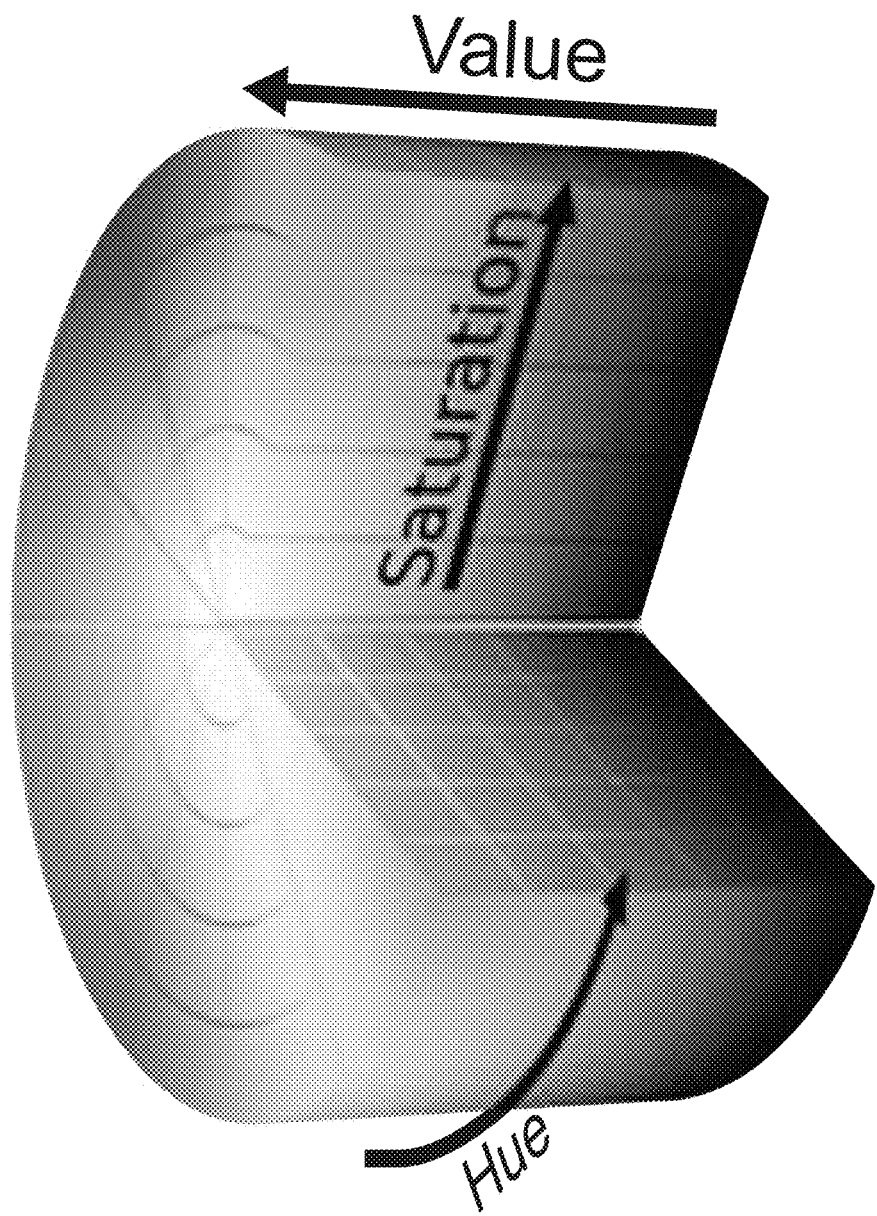
FIG. 6 is a diagram of an example HSV color space in accordance with embodiments of this disclosure.

FIG. 6 is a diagram of an example HSV color space in accordance with embodiments of this disclosure (https://en.wikipedia.org/wiki/HSL and HSV). In an implementation, the hue may be represented by an angle $\Theta$, the saturation may be represented by a radius r, and the luminance-like called "value" or "v" may be represented by the height within the cylinder. Other representations may be possible.

Figure 7:
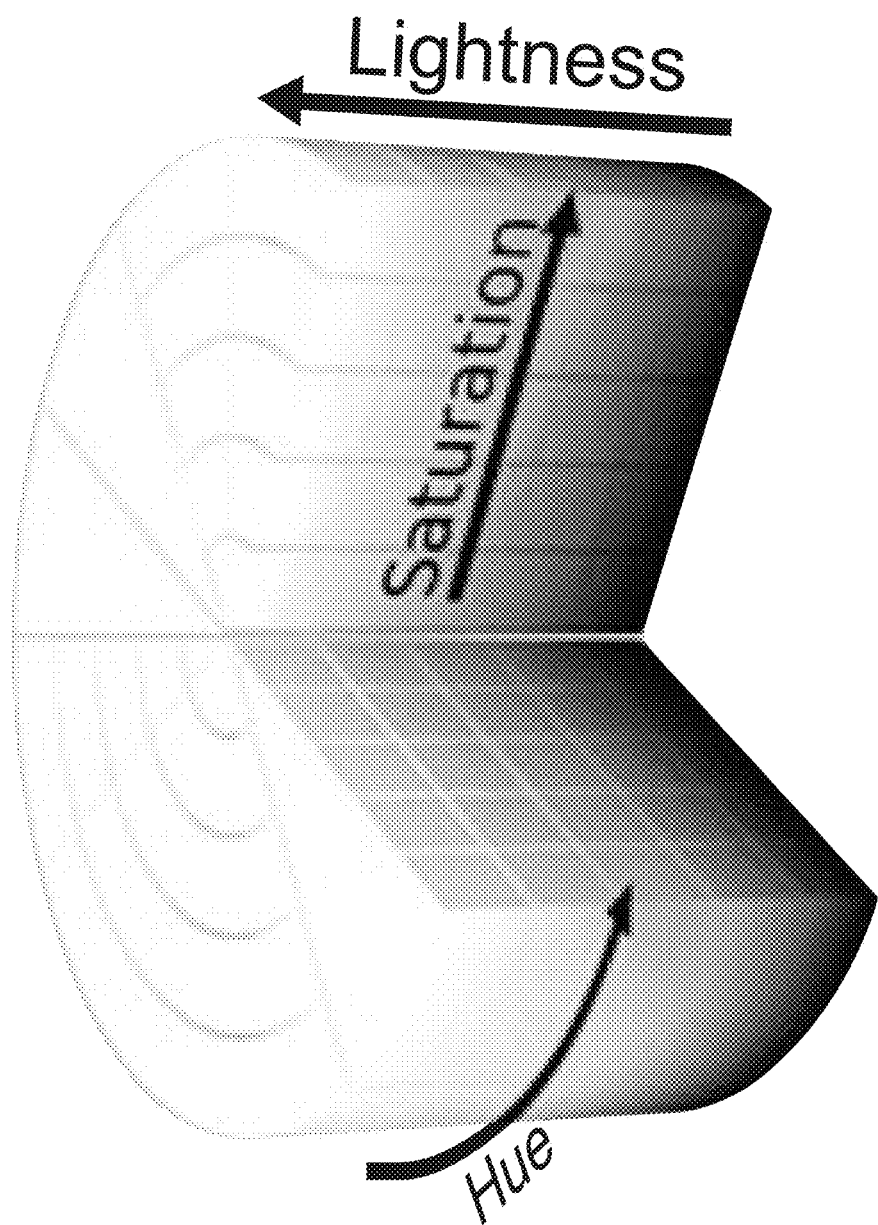
FIG. 7 is a diagram of an example HSL color space in accordance with embodiments of this disclosure.

FIG. 7 is a diagram of an example HSL color space in accordance with embodiments of this disclosure (https://en.wikipedia.org/wiki/HSL and HSV). In an implementation, the hue may be represented by an angle $\Theta$, the saturation may be represented by a radius r, and the lightness may be represented by the height within the cylinder. Other representations may be possible.

Figure 8:
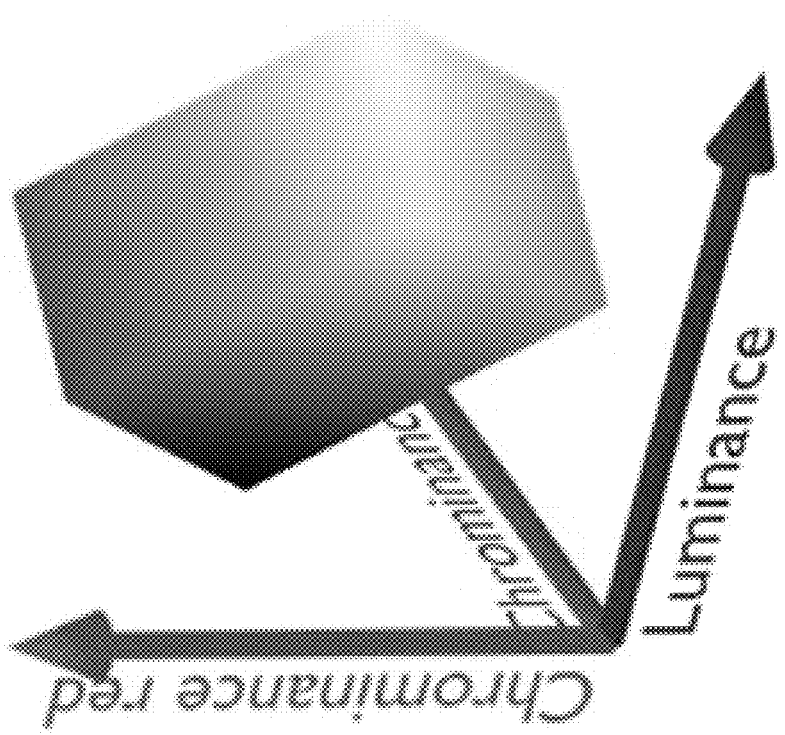
FIG. 8 is a diagram of an example YCbCr color space in accordance with embodiments of this disclosure.

FIG. 8 is a diagram of an example YCbCr color space in accordance with embodiments of this disclosure (https://en.wikipedia.org/wiki/Talk%3AYCbCr). In an implementation, for a fixed luminance (Y), hue may defined as $$\theta = \arctan\left(\left|\frac{Cr}{Cb}\right|\right)$$

and saturation may be defined as $r=\sqrt{Cb^2+Cr^2}$. Other representations may be possible. The YUV color space may be similarly used as the YCbCr color space.

Returning to FIG. 4, the image signal processor 405 may include a non-linear color correction unit 415. In an implementation, the non-linear color correction unit 415 may operate on input images in one of the alternate color space formats such as HSL, HSV, YCbCr, YUV and the like color space formats. The non-linear color correction unit 415 may perform a localized color modification. In an implementation, the non-linear color correction unit 415 may modify hue values to adjust color rendering for specific areas, regions, or pixels in a scene in the input image without affecting non-selected colors or minimally affecting boundary or edge areas to avoid color inversion or discontinuity. A hue value modification may be implemented by angle rotation for a fixed value v in the HSV color space format.

Figure 9B:
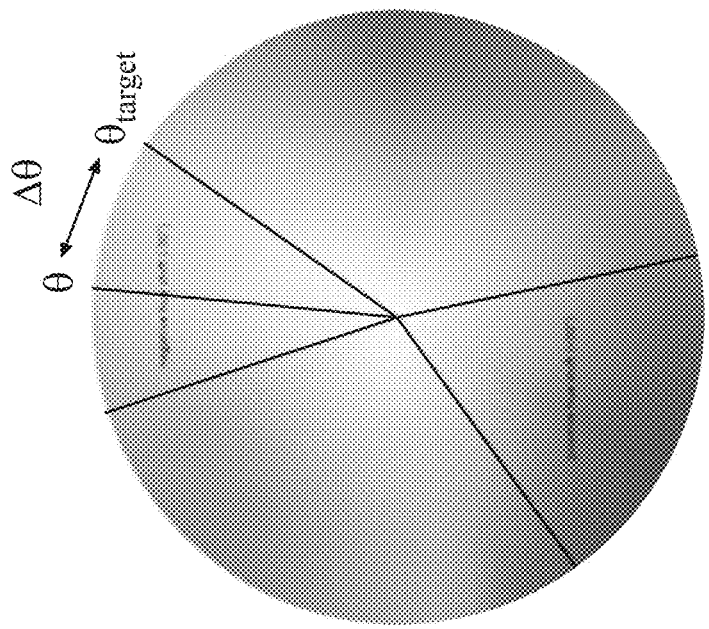
FIGS. 9A and 9B are diagrams of an example input hue, saturation (HS) plan and an example modified HS plan, respectively, for a local hue change in HSV space in accordance with embodiments of this disclosure.
Figure 9A:
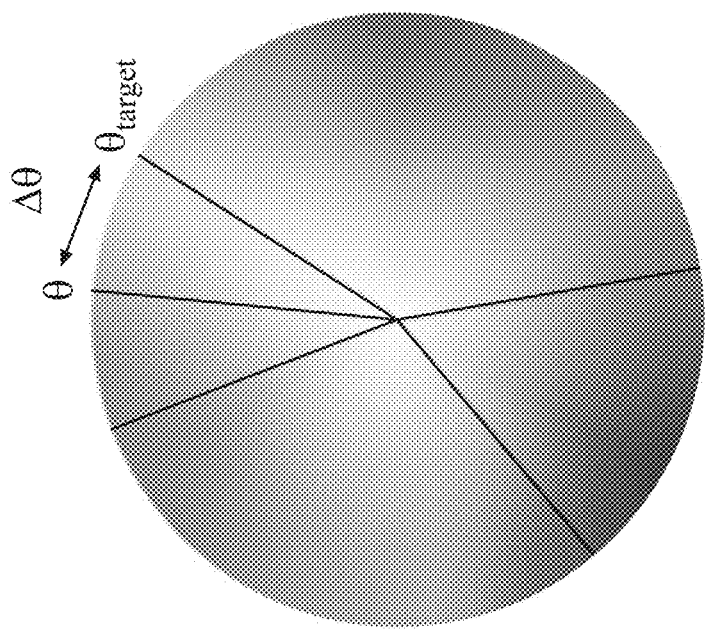

For example, FIGS. 9A and 9B show diagrams of an example input hue, saturation (HS) plan, and an example modified HS plan, respectively, for a local hue change in HSV space in accordance with embodiments of this disclosure. A hue value to be modified may be defined by setting a value for the angle $\Theta$ and by setting a target angle $\theta_{target}$ for a fixed value v. The non-linear color correction unit 415 may then match the $\Theta$ angle to the target angle, $\theta_{target}$ by rotating the target angle $\theta_{target}$ to the angle $\Theta$, i.e. setting $\theta=\theta_{target}$ by performing a rotation defined by $\Delta\theta=\theta_{target}-\theta$, where $\Delta\theta$ may be the rotation angle.

Returning to FIG. 4, to localize the hue modification, the non-linear color correction unit 415 may perform a weighted blending of the original hue values with the modified or rotated hue values for all of the colors to localize the hue modification. That is, the rotated color space may be blended with the original color space. In an implementation, the hue change may impact all $\Theta$ angle values within a margin angle, where the margin angle $\phi$ represents a blended region. In an implementation, the weights may be chosen to emphasize the input HS plan in regions outside the rotation angle. In an implementation, the weights may be chosen to emphasize the input HS plan in regions outside the rotation angle plus the margin angle $\phi$.

A hue value modification may be implemented by compressing colors in a range $\phi L-\theta_{target}$ into a range $\phi L-\Theta$ and stretching or extending colors in a range $\phi R-\theta_{target}$ into a range $\phi R-\Theta$. For example, compression may be performed by linear compression techniques and the like. This results in a color change by distorting the colors and by not moving the color plan. Non-selected colors may not be affected. In this implementation, blending may not be needed.

Figures 10A, 10B:
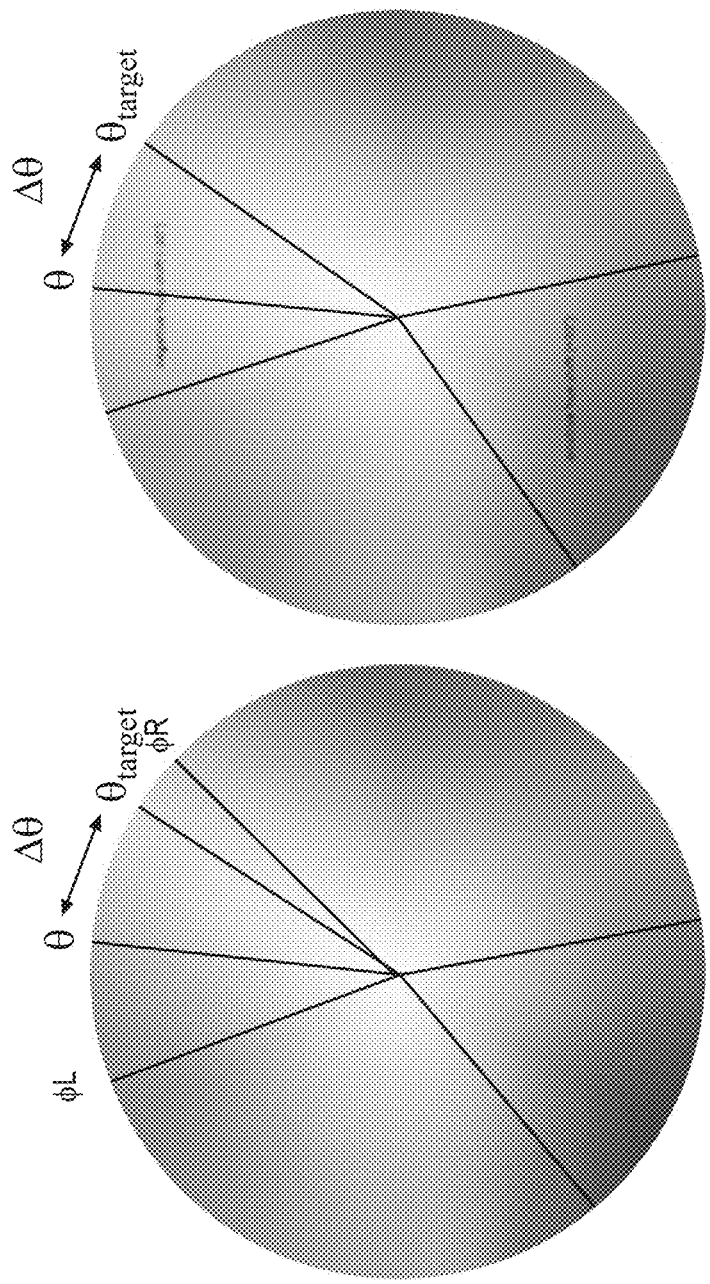
FIGS. 10A and 10B show diagrams of an example input HS plan and an example modified HS plan, respectively, for a local hue change in HSV space in accordance with embodiments of this disclosure.

For example, FIGS. 10A and 10B show diagrams of an example input hue, saturation (HS) plan and an example modified HS plan, respectively, for a local hue change in HSV space in accordance with embodiments of this disclosure.

Returning to FIG. 4, and in an implementation, the non-linear color correction unit 415 may modify saturation values to adjust color rendering for specific areas, regions or pixels in a scene in the input image without affecting non-selected colors or minimally affecting boundary or edge areas to avoid color inversion or discontinuity. For example, the saturation value r may be modified for a given $\Theta$ angle in the HSL color space format. In an implementation, the saturation value r may be set to a target value $r_{target}$. In an implementation, $r_{target}$ may be equal to a function $f$ so as to change saturation for a whole range of target values, i.e. $r_{target}=f(r)$. In an implementation, the function $f$ may be a square root function, a S-shaped curve and the like. In an implementation, the function $f$ may be implemented as a look-up table or a piece-wise linear interpolation. In an implementation, saturation changes may be blended as described above for hue changes.

In an implementation, the non-linear color correction unit 415 may generate the parameters for hue and saturation changes in the alternate space color. In an implementation, the non-linear color correction unit 415 may apply the parameters for hue and saturation changes in the alternate space color. In an implementation, the non-linear color correction unit 415 may apply the parameters for hue and saturation changes in the RGB space color. In this implementation, the non-linear color correction unit 415 may include an Alternate Color Space to RGB (ACS2R) conversion unit (not shown). The determined parameters may then be transformed to the RGB color space.

The image signal processor 405 may include other image signal processing units 420 including tone mapping units and the like to process the output image before storage, transmission, or display.

FIG. 5 is a flowchart of an example technique 500 for performing non-linear color correction. The technique 500 includes: receiving 505 an image from an image sensor in a RGB color space format; converting 510 the RGB color space format to an alternate color space format; determining 515 an area, region or pixel, and a color for change; determining 520 the color correction parameters; when applicable, converting 525 the parameters from the alternate color space format to the RGB color space format; applying 530 the color correction parameters; and storing, displaying, or transmitting 535 an output image. For example, the technique 500 may be implemented by the image capture device 100 shown in FIGS. 1A-1D, the image capture device 200 shown in FIGS. 2A-2D or the image capture device 310 shown in FIGS. 3A-3B.

The technique 500 includes receiving 505 images from the image sensors. The image sensors may be part of an image capture apparatus (e.g., the image capture device 100, the image capture device 200, or the image capture device 310). In some implementations, the image sensors may be attached to a processing apparatus that implements the technique 500. For example, the images may be received 505 as input image signals, which may represent each pixel value in a defined format, such as in a RAW image format. For example, the raw image signal may be in a format such as RGB format, which may represent individual pixels using a combination of values or components, such as a red component (R), a green component (G), and a blue component (B). In some implementations, the images may be frame of video, i.e., one of a sequence of images of a video. In some implementations, the images are received 505 directly from the image sensors without intermediate image processing. In some implementations, the images are received 505 after being subjected to intermediate image processing (e.g., correction of dead pixels, band processing, decoupling of vertical blanking, spatial noise reduction, and/or temporal noise reduction).

The technique 500 includes converting 510 from the RGB color space format to an alternate color space format such as the HSL, HSV, YCbCr, YUV, and the like color space formats.

The technique 500 includes determining 515 areas, regions or pixels, and color changes that may require color correction. In an implementation, determination may be based on scene determination, external input, camera sensors, and the like.

The technique 500 includes determining 520 localized color correction parameters. In an implementation, the determining 520 may determine localized hue correction parameters. In an implementation, the determining 520 may determine localized saturation correction parameters. In an implementation, the determining 520 may determine localized hue and localized saturation correction parameters.

In an implementation, the determining 520, given a fixed lightness for example, may include selecting an angle representative of a hue or color on a color plan, selecting a target angle representative of a target color on the color plan, and rotating the color plan from the target angle to the angle to generate a rotated color plan. The determining 520 may include blending the color plan and the rotated color plan on a weighted basis to generate the localized hue color correction parameters.

In an implementation, the determining 520, given a fixed lightness for example, may include selecting an angle representative of a hue or color on a color plan, selecting a target angle representative of a target color on the color plan, selecting a compression angle and selecting an extension angle. The determining 520 may compress the color range between the target angle and the compression angle into the color range defined by the angle and the compression angle and extend the color range between the target angle and extension angle into the color range defined by the angle and the extension angle to generate the localized hue color correction parameters.

In an implementation, the determining 520, given a fixed hue for example, may include selecting a target saturation value or a range of target saturation values for the color plan to generate a saturation modified color plan. The determining 520 may include blending the color plan and the modified color plan to generate localized saturation correction parameters.

The technique 500 includes converting 525 the color correction parameters from the alternate color space formation to the RGB color space format when applicable.

The technique 500 includes applying 530 the color correction parameters to generate an output image.

The technique 500 includes storing, displaying, or transmitting 535 an output image. In an implementation, additional processing may be done prior to the storing, displaying, or transmitting 535 including applying tone mapping and the like.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
 receiving an input image from an image sensor;
 determining localized color correction parameters for a selected color and a selected dimension in a color space where dimensions defining the color space are independently adjustable, wherein the determining further comprises:

selecting an angle on a color plan;
selecting a target angle on the color plan; and
applying a function between the angle and the target angle to determine the localized color correction parameters;
applying the localized color correction parameters to the input image to generate an output image, wherein the applying further comprises:
rotating the target angle towards the angle to generate a rotated color plan; and
blending the color plan and the rotated color plan to generate the localized correction parameters, the angle and the target angle representing the selected dimension on the color plan and the rotated color plan; and
storing, displaying, or transmitting the output image based on at least the localized color correction parameters.

2. The method of claim 1, wherein the applying the localized color correction parameters is done in a linear color space.

3. The method of claim 1, wherein the applying the localized color correction parameters is done in the color space.

4. The method of claim 1, wherein the determining localized color correction parameters further comprises:
determining localized hue correction parameters, wherein hue is the selected dimension.

5. The method of claim 4, wherein the determining localized color correction parameters further comprises:
determining localized saturation correction parameters for a given hue, wherein saturation is another selected dimension.

6. The method of claim 1, wherein the determining localized color correction parameters further comprises:
determining localized saturation correction parameters, wherein saturation is the selected dimension.

7. The method of claim 6, wherein the determining localized color correction parameters further comprises:
determining localized hue correction parameters for a given saturation, wherein hue is another selected dimension.

8. The method of claim 1, wherein the blending is a weighted blending to generate localized hue color correction parameters.

9. The method of claim 1, wherein the blending is a weighted blending favoring the color plan in non-selected angles to localize changes.

10. The method of claim 1, wherein in lieu of the rotating and the blending, the applying the function comprises:
selecting a compression angle on the color plan;
selecting an extension angle on the color plan;
compressing a color range between the target angle and the compression angle into a color range defined by the angle and the compression angle; and
extending a color range between the target angle and the extension angle into a color range defined by the angle and the extension angle,
wherein the compressing and the extending are performed to generate the localized color correction parameters, and
wherein the angle, the target angle, the compression angle, and the extension angle represent the selected dimension on the color plan.

11. The method of claim 1, wherein the color space includes at least hue, saturation, and lightness (HSL), hue, saturation, and value (HSV), luminance, chrominance red, and chrominance blue (YCbCr), and luminance and two chrominance (YUV) color spaces.

12. A method comprising:
receiving an input image from an image sensor in a linear color space;
determining localized color correction parameters for a selected color and a selected dimension in a color space by applying a function between an angle and a target angle in a color plan, wherein dimensions defining the color space are independently adjustable and the angle and the target angle represent the selected dimension;
applying, in the linear color space, the localized color correction parameters to the input image to generate an output image, wherein the applying further comprises:
rotating the target angle towards the angle to generate a rotated color plan; and
blending the color plan and the rotated color plan to generate the localized correction parameters; and
storing, displaying, or transmitting the output image based on at least the localized color correction parameters.

13. The method of claim 12, wherein the determining localized color correction parameters further comprises:
selecting the angle on the color plan; and
selecting the target angle on the color plan.

14. The method of claim 12, wherein the determining localized color correction parameters further comprises at least one of:
determining localized hue correction parameters, wherein hue is the selected dimension; or
determining localized saturation correction parameters, wherein saturation is the selected dimension.

15. The method of claim 12, wherein the blending is a weighted blending to generate localized hue color correction parameters.

16. The method of claim 12, wherein in lieu of the rotating and the blending, the applying the function comprises:
selecting a compression angle on the color plan;
selecting an extension angle on the color plan;
compressing a color range between the target angle and the compression angle into a color range defined by the angle and the compression angle; and
extending a color range between the target angle and the extension angle into a color range defined by the angle and the extension angle,
wherein the compressing and extending are performed to generate the localized color correction parameters, and
wherein the angle, the target angle, the compression angle and the extension angle represent the selected dimension on the color plan.

17. A method comprising:
receiving an input image from an image sensor;
determining localized color correction parameters for a selected color and a selected dimension in a color space by applying a function between an angle and a target angle in a color plan, wherein dimensions defining the color space are independently adjustable;
applying the localized color correction parameters to the input image to generate an output image by selecting a compression angle on the color plan, selecting an extension angle on the color plan, compressing a color range between the target angle and the compression angle into a color range defined by the angle and the compression angle, and extending a color range between the target angle and the extension angle into a color range defined by the angle and the extension angle to generate the localized color correction parameters; and storing, displaying, or transmitting the output image based on at least the localized color correction parameters.

18. The method of claim 17, wherein the applying the localized color correction parameters is done in a linear color space.

19. The method of claim 17, wherein the applying the localized color correction parameters is done in the color space.

20. The method of claim 17, wherein the determining localized color correction parameters further comprises at least one of:

determining localized hue correction parameters, wherein hue is the selected dimension; or determining localized saturation correction parameters, wherein saturation is the selected dimension.

* * * * *